UNITED STATES PATENT OFFICE.

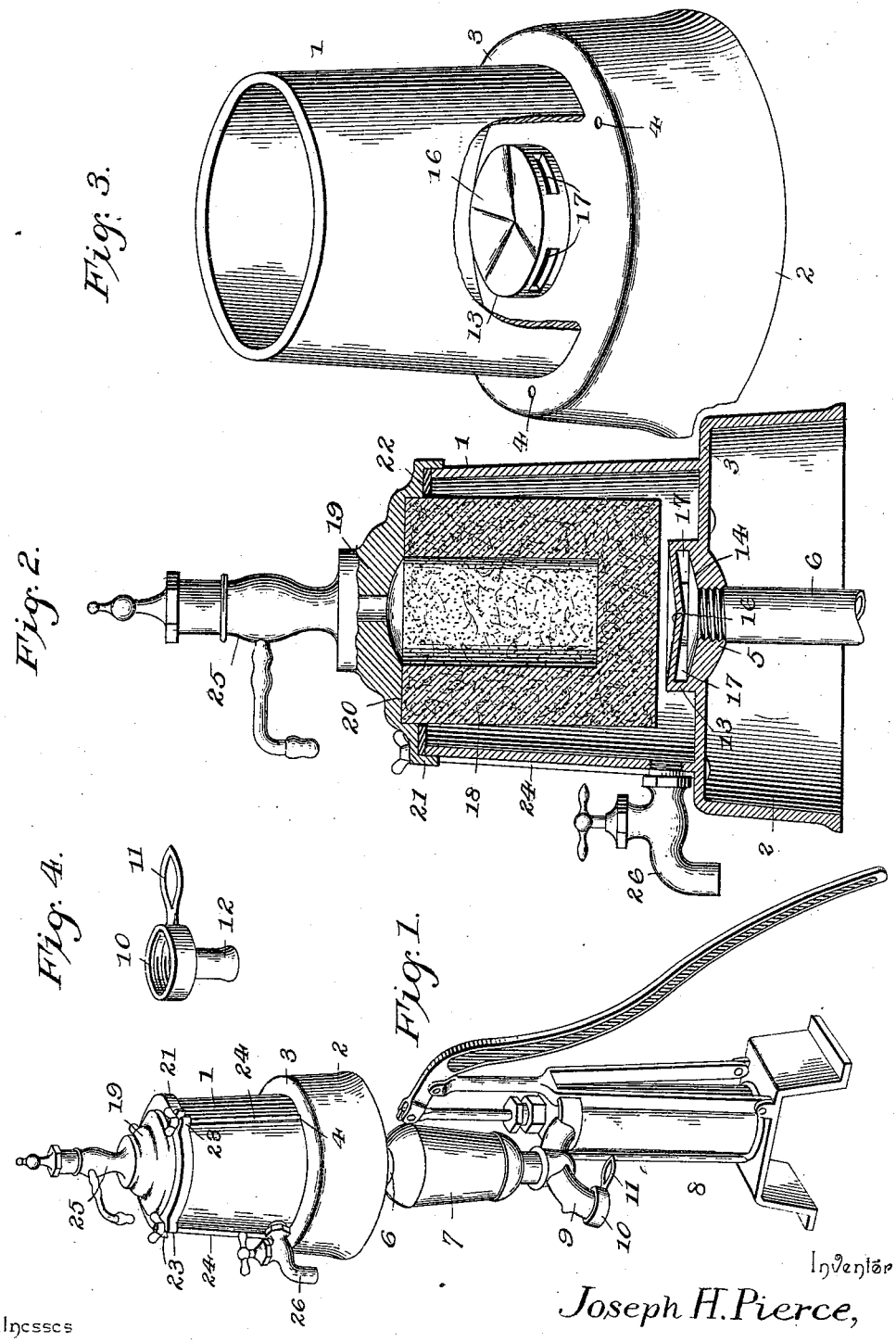

JOSEPH H. PIERCE, OF BLOOMINGTON, ILLINOIS.

WATER-FILTER.

SPECIFICATION forming part of Letters Patent No. 562,151, dated June 16, 1896.

Application filed February 4, 1895. Serial No. 537,282. (No model.)

*To all whom it may concern:*

Be it known that I, JOSEPH H. PIERCE, a citizen of the United States, residing at Bloomington, in the county of McLean and State of Illinois, have invented a new and useful Water-Filter, of which the following is a specification.

This invention relates to water-filters; and it has for its object to provide a new and useful filter providing simple and efficient means for the thorough filtration of water under pressure.

To this end the main and primary object of the present invention is to construct a filter especially adapted for use in conjunction with pumps, hydrants, and the like to provide for the thorough filtering of the water that is discharged thereby.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a force-pump combined with a filter constructed in accordance with this invention. Fig. 2 is a central vertical sectional view of the filter disconnected from the pump. Fig. 3 is a detail in perspective, partly in section, of the cylindrical casing-body of the filter. Fig. 4 is a detail in perspective of a modified form of closure-cap for the pump-spout.

Referring to the accompanying drawings, 1 designates the cylindrical casing-body of the filter closed at the bottom and provided with an open upper end. The cylindrical casing-body 1 of the filter may or may not be provided with an annular depending rest-flange 2 at its lower end, but is always provided directly at its lower end with the circular base-flange 3, provided therein at spaced points with the bolt-openings 4. The cylindrical casing-body 1 is provided at the bottom thereof with a depending integral interiorly-threaded inlet-neck 5, that is adapted to be fitted onto the threaded upper end of a nipple connection 6 for connecting the bottom of the casing-body with the top of the air-chamber 7 of an ordinary force-pump 8; but it will of course be understood that by means of a similar nipple connection 6 the casing-body of the filter may be connected with a hydrant, or in connection with a line of piping carrying water under pressure, so that the water will be directed under pressure into the casing-body 1 through the bottom inlet-neck 5 thereof.

When the filter is used in connection with a force-pump, as illustrated in the drawings, the spout 9 of such force-pump is adapted to detachably receive on the outer end thereof a closure-cap 10, provided with a handle 11, for easily manipulating the same, and providing means for cutting off the flow of water through the spout and compelling the same to pass up through the air-chamber 7 and into the filter, and at this point it will be obvious that a cut-off valve in the spout of the pump would secure the same result as the preferred cap 10. While the form of cap 10 (shown in Fig. 1 of the drawings) is preferably employed, in order that the force-pumps provided with the filters may be used in connection with a hose, the cap 10 may be provided with an offstanding attaching-neck 12, providing a convenient arrangement for a hose connection.

The cylindrical casing-body 1 is provided 80 centrally within the bottom thereof directly above and communicating with the neck 5 with a cylindrical water-distributing cage 13. The cylindrical water-distributing cage 13 is preferably formed integrally with the bottom 85 of the casing-body 1, and is provided with an inclined lower side 14, leading off from the upper end of the neck 5, and with a downwardly-dished closed conical top portion 16, which together with the inclined lower side 90 14 of the cage provides an upwardly-inclined passage for the water, and the water escapes from the cage 13 through a series of lateral distributing-openings 17, formed in the side of the said cage. 95

By reason of the specific construction of water-distributing cage, it will be obvious that the water will be caused to break up into a number of small streams and into a spray, while at the same time the water will be directed against the inner sides of the casing-body and then upwardly within said casing-body without being forced directly against the hollow filter-stone 18, that is removably fitted within the casing-body 1 directly above the cage 13. Furthermore, by reason of thus distributing the incoming water within the bottom of the casing-body, the exterior surface of the filter-stone 18 will be kept constantly clean without requiring to be removed from the casing-body except at long intervals.

The filter-stone 18 is formed of suitable porous filtering material and is made cylindrical in shape so as to fit loosely within the casing-body 1. The hollow cylindrical stone 18 is closed at its lower end and is securely fitted at its upper open end within the detachable casing-cap 19. The detachable casing-cap 19 is provided in its under side with an annular seat or recess 20 to receive the upper end of the stone 18, and is provided with a flanged rim 21, surrounding the upper end of the stone 18, and fitting over the upper edge of the casing-body 1. A gasket-ring 22 is fitted within the rim 21 to form a water-tight joint therebetween and the body 1.

The detachable casing-cap 19 is provided at its edges with a series of spaced notched bolt-lugs 23, that detachably receive the upper end of the tie-bolts 24, arranged outside of the casing-body 1, and secured at their lower ends in the bolt-openings 4 of the base-flange 3. The bolt connections between the casing-body and its cap provide means for rigidly securing these parts together, while at the same time admitting of the ready removal of the cap and the filter-stone carried thereby. A cock 25 is fitted to the center of the detachable cap 19, and communicates with the interior of the hollow stone 18 to provide for drawing off filtered water, and a similar cock 26 is fitted to one side of the casing-body 1 to provide for drawing off unfiltered water when wanted and also admitting of a drainage of sediment that may have collected within the casing-body.

From the above it is thought that the construction, operation, and many advantages of the herein-described filter will be readily apparent without further description, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a water-filter, the combination of a cylindrical casing-body provided with a central inlet-neck at the bottom, and with a water-distributing cage arranged directly above and communicating with said neck, a cap detachably fitted on the upper end of the casing-body, a hollow filter-stone fitted at its upper open end to the cap, and a cock attached to the cap, substantially as set forth.

2. In a water-filter, the combination of a cylindrical casing-body provided with a central bottom inlet-opening, and an integral cylindrical water-distributing cage projected inwardly above said opening, said cage being provided with an inclined lower side, a downwardly-dished conical top portion, and a series of lateral distributing-openings, a cap fitted on the upper end of the casing-body, a hollow filter-stone fitted at its upper open end to the cap, and a cock connected to the cap, substantially as set forth.

In testimony that I claim the foregoing as my own I have hereto affixed my signature in the presence of two witnesses.

JOSEPH H. PIERCE.

Witnesses:
R. S. McINTYRE,
JOHN H. WOOD.